United States Patent [19]

Bean, Jr. et al.

[11] 4,304,886

[45] Dec. 8, 1981

[54] MIXED COUPLING AGENT PROCESS

[75] Inventors: Arthur R. Bean, Jr.; Glenn R. Himes, both of Houston, Tex.

[73] Assignee: Shell Oil Company, Houston, Tex.

[21] Appl. No.: 227,128

[22] Filed: Jan. 22, 1981

[51] Int. Cl.$^3$ .................. C08L 53/00; C08L 53/02
[52] U.S. Cl. .................. 525/314; 525/901; 525/386; 525/377; 525/374; 525/359; 525/356; 525/342; 525/340; 525/334; 525/333; 525/123; 525/315; 525/316; 260/23.7 R
[58] Field of Search .......... 525/901, 314, 333, 334, 525/340, 342, 356, 359, 123, 374, 377, 386, 315, 316; 260/23.7

[56] References Cited

U.S. PATENT DOCUMENTS

| | | | |
|---|---|---|---|
| 3,244,664 | 4/1966 | Zelinski et al. | 260/41.5 |
| 3,281,383 | 10/1966 | Zelinski et al. | 260/23.7 |
| 3,594,452 | 7/1971 | De La Mare et al. | 260/880 |
| 3,766,301 | 10/1973 | De La Mare et al. | 260/879 |
| 3,880,954 | 4/1975 | Kahle et al. | 260/879 |
| 3,985,830 | 10/1976 | Fetters et al. | 260/880 |
| 4,104,326 | 8/1978 | Fodor | 525/901 |
| 4,104,332 | 8/1978 | Zelinski | 260/880 |
| 4,163,764 | 8/1979 | Nash | 525/93 |

FOREIGN PATENT DOCUMENTS 1014999 12/1965 United Kingdom ............. C 08d/

*Primary Examiner*—Carman J. Seccuro
*Attorney, Agent, or Firm*—Dean F. Vance

[57] ABSTRACT

Lithium metal-terminated polymers of one or more alkadienes and of one or more monoalkenyl arenes are coupled by reaction with a mixture of two different coupling agents having different functionality.

7 Claims, No Drawings

4,304,886

MIXED COUPLING AGENT PROCESS

BACKGROUND OF THE INVENTION

The coupling of lithium metal-terminated polymers is a process known in the art. In accordance with this known process, a lithium metal-terminated polymer is treated with a compound having two or more functional groups containing two or more reactive sites capable of reacting with the carbon-lithium metal bonds of the lithium metal-terminated polymer. In many cases the multifunctional coupling agent thereby becomes a nucleus for the resulting structure. From this nucleus long chain polymeric branches radiate and such coupled polymers have specific properties that render them useful for particular applications.

Linear polymers are formed by employing coupling agents having two reactive sites. One type of coupling agent employed in forming linear polymers is a dihalo alkane such as dibromoethane. See G. B. U.S. Pat. No. 1,014,999. Another coupling agent employed in making linear polymers is phenyl benzoate as disclosed in U.S. Pat. No. 3,766,301. Radial polymers are formed by employing coupling agents having more than two reactive sites. Examples of such coupling agents include among others: $SiCl_4$—U.S. Pat. No. 3,244,664; Polyepoxides, polyisocyanates, polyimines, polyaldehydes, polyketones, polyanhydrides, polyesters, polyhalides—U.S. Pat. No. 3,281,383; Diesters—U.S. Pat. No. 3,594,452; Methoxy silanes—U.S. Pat. No. 3,880,954; Divinyl benzene—U.S. Pat. No. 3,985,830; and 1,3,5-benzenetricarboxylic acid trichloride—U.S. Pat. No. 4,104,332.

There are distinct property differences between linear polymers and radial polymers. Linear polymers have only two arms while radial polymers have three or more arms. Typically, linear polymers have good mechanical properties but poor flow at high molecular weights. Radial polymers have better flow properties than linear polymers of the same molecular weight. In the past, manufacturers would alter the molecular weight of the arms to change properties or would blend together radial polymers and linear polymers to achieve the necessary property effect.

A new process has been found that results in the preparation of a polymer having the desired polymer functionality (number of arms) without having to blend together two different polymers.

SUMMARY OF THE INVENTION

The present invention broadly encompasses a process for producing a branched polymer having an average functionality of about X arms comprising reacting a living lithium-terminated polymer having the formula P-Li with a mixture of m moles of a first coupling agent and n moles of a second coupling agent wherein:
(a) P is selected from the group consisting of polymer chains of one or more alkadienes having 4–12 carbon atoms and copolymer chains of one or more alkadienes having 4–12 carbon atoms and one or more monoalkenyl arenes of 8–18 carbon atoms having the alkenyl radical attached to an arene ring carbon atom;
(b) said first coupling agent has a functionality of about Y;
(c) said second coupling agent has a functionality of about Z;
(d) the functionality values of X, Y and Z are all different; and
(e) the amounts m and n are employed such that (m times Y) plus (n times Z) divided by (m+n) has a value between about 0.8X and 1.2X.

Functionality refers to the calculated average number of polymer arms (P) in the polymer. Functionality is calculated by dividing the peak average molecular weight by the uncoupled polymer molecular weight. When referring to a coupling agent, functionality means the average number of polymer arms expected from previous polymerization experience. For example, while diesters such as those disclosed in U.S. Pat. No. 3,594,452 have four sites for attachement, the functionality is only about 3.6, apparently due to a certain amount of steric hinderance.

By employing the present invention, it is possible to prepare the desired polymer of a controlled functionality and with certain properties without having to blend polymers together or unnecessarily alter other aspects of the polymer, such as precoupled molecular weight and composition.

DETAILED DESCRIPTION OF THE INVENTION

The preferred group of acyclic conjugated alkadienes that can be polymerized into the polymer chain P are those containing 4–8 carbon atoms. Examples for such alkadienes are 1,3-butadiene, 2,3-dimethyl-1,3-butadiene, piperylene, 3-butyl-1,3-octadiene, isoprene, 2-phenyl-1,3-butadiene.

Monoalkenyl arenes that can be polymerized together with the alkadienes to form the polymer chain P preferably are those selected from the group consisting of styrene, the methylstyrenes, particularly 3-methylstyrene, the propylstyrenes, particularly 4-propylstyrene, vinylnapthalene, particularly 1-vinylnaphthalene, cyclohexylstyrenes, particularly 4-cyclohexylstyrene, p-tolylstyrene, and 1-vinyl-5-hexylnaphthalene.

The polymer chains P can be homopolymers of the alkadiene monomers defined or can be copolymers of alkadiene monomers and monoalkenyl-substituted aromatic monomers. These copolymers, in turn, can be random or tapered copolymers, as well as block copolymers of these various monomers. The presently preferred monomers are isoprene, 1,3-butadiene and styrene. The presently preferred polymer chains P are those in which the conjugated dienes are present in a major amount and the monovinyl-substituted arenes are present in a minor amount.

The presently preferred polymer is one that is obtained by coupling a living lithium metal-terminated polymer selected from the group consisting of homopolymers of alkadienes having 4 to 12 carbon atoms and copolymers of at least one alkadiene of 4 to 12 carbon atoms and at least one monoalkenyl-substituted arene of 8 to 18 carbon atoms.

The molecular weight of the polymers of this invention can vary in broad ranges. For the usual applications of the coupled polymers, the number average molecular weight will be in the range of about 6,000 to about 2,000,000.

Those polymers in which the polymer chain P has a structure A—B— so that B is attached to the coupling agent, and in which A represents a block of monoalkenylarenes, preferably a polystyrene block, and B represents a block that confers rubbery properties to the polymer chain, such as a polyalkadiene block, a copolymer block of an alkadiene and a monoalkenyl-substituted arene, or a combination of such blocks constitutes a presently preferred polymer. Such a polymer exhibits properties both of an elastomer and of a thermoplastic polymer. Therefore, such polymers can be formed into articles by standard procedures known for producing articles from thermoplastic polymers while the finished article exhibits elastomeric properties.

Furthermore, specific polymers constituting preferred embodiments of this invention are those obtained by reactions and procedures disclosed in detail in the following description of a process to make these polymers.

In accordance with another embodiment of this invention, there is provided a process for making the polymers defined above which comprises a coupling reaction between a living polymer having the formula P-Li and the coupling agent mixture as defined above, wherein Li is lithium metal and P is as described above.

The present invention employs a mixture of a first coupling agent having a Y functionality (capable of producing a polymer having on the average of Y number of arms) and a second coupling agent having a Z functionality (capable of producing a polymer having on the average of Z number of arms). The mixture produces a polymer having an average functionality of X arms, X, Y and Z being different values, with X being somewhere in value between Y and Z.

Various suitable coupling agents include the following shown in Table I:

TABLE I

| Patent Number | Group |
| --- | --- |
| G.B. 1,014,999 | Dihalo alkanes |
| G.B. 1,276,320 | Monoester, monocarboxylate salt, mononitrile, monoamide, monoacetylene, monoisocyanate, monothiocyanate |
| U.S. Pat. No. 3,427,364 | CO |
| U.S. Pat. No. 3,594,452 | Diester |
| U.S. Pat. No. 3,766,301 | Phenyl benzoate |
| U.S. Pat. No. 3,078,354 | 'Activated' organic chloride |
| U.S. Pat. No. 3,147,313 | Phosphine or phosphine chloride |
| U.S. Pat. No. 3,244,664 | Silicon halide |
| U.S. Pat. No. 3,281,383 | Polyfunctional (for radial) |
| U.S. Pat. No. 3,692,874 | SiCl$_4$ + diene |
| U.S. Pat. No. 3,787,510 | Use of DVB |
| U.S. Pat. No. 3,803,266 | Phosphorus ester |
| U.S. Pat. No. 3,880,954 | Use of methoxy silane |
| U.S. Pat. No. 4,039,633 | Carboxylic halide of benzene |
| U.S. Pat. No. 4,049,753 | Anhydride of monocarboxylic acid |
| U.S. Pat. No. 4,086,406 | Vinylhalomethylarene |
| U.S. Pat. No. 4,105,714 | Trihalo-s-triazine |
| U.S. Pat. No. 3,598,887 | COS |
| U.S. Pat. No. 3,632,682 | Halogen |
| U.S. Pat. No. 3,639,367 | Monohalohydrocarbon |
| U.S. Pat. No. 3,737,421 | CCl$_4$ or CHCl$_3$ |
| U.S. Pat. No. 3,985,830 | DVB stars |
| U.S. Pat. No. 4,104,332 | Di-, tri-, or tetra-carboxylic halide of benzene |
| U.S. Pat. No. 4,174,360 | Anhydride of carboxylic acid |
| U.S. Pat. No. 4,108,945 | Multifunctional nucleus |

The selection of which two coupling agents to employ depends upon a number of considerations. One consideration is the expected functionality. Values of functionality for various coupling agents determined by dividing the molecular weight of coupled polymer over the molecular weight of the polymer prior to coupling are shown below in Table II:

TABLE II

| | Overall Structure | Functionality Value |
| --- | --- | --- |
| Dibromoethane | linear | 1.95 |
| Methyl benzoate | linear | 1.95 |
| Amyl acetate | linear | 1.90 |
| Methyl pivalate | linear | 1.93 |
| Diethyl adipate | branched | 3.6 |
| Vinyl ester "VeoVa" C$_{10}$ | linear | 1.93 |
| Tetraethoxysilane | branched | 3.7 |
| 3-Acetyl-2,6-heptadione | branched | 2.6 |
| 1,3,5-triacetylbenzene | branched | 2.5 |
| "EPIKOTE" F828 | linear | 1.93 |
| Epoxidized linseed oil | branched | 2.3 |
| Epoxidized glycol dioleate | linear | 1.86 |
| Epoxidized 2-ethylhexyl oleate | linear | 1.90 |
| Epoxidized soybean oil | branched | 1.92 |

Preferably, the functionality of the first coupling agent (value of Y) is between about 1.5 and about 2.5 while the functionality of the second coupling agent (value of Z) is greater than about 3.0; preferably Z has a value between about 3.2 and about 6.0.

Other considerations in selecting a coupling agent mixture includes coupling efficiency, chemical nature of the coupling agent, cost, reactivity, and the like.

The amount of coupling agent employed depends upon the desired average functionality of the resulting polymer along with the expected functionality of each of the coupling agents. In order to prepare a polymer having a functionality of X (plus or minus 0.2X) it is necessary to use m moles of a first coupling agent having a functionality of about Y and n moles of a second coupling agent having a functionality of about Z, where $$X = (m \cdot Y + n \cdot Z)/m + n$$

The temperature at which the coupling reaction is carried out can vary over a broad range and, for convenience, often is the same as the temperature of polymerization. Although the temperature can vary broadly from about 0° to 150° C., it will preferably be within the range from about 20° C. to 100° C.

The coupling reaction is normally carried out by simply mixing the coupling agents, neat or in solution, with the living polymer solution. The reaction period is usually quite short. The normal duration of the coupling reaction will be in the range of 1 minute to 1 hour. Longer coupling periods may be required at lower temperatures.

After the coupling reaction, the coupled polymers are recovered by treating the reaction mixture with terminating agents containing active hydrogens such as alcohols or water or aqueous acid solutions or mixtures thereof. It is usually preferred to add an antioxidant to the reaction mixture before isolation of polymer.

The polymer is separated from the reaction mixture by standard techniques, such as steam stripping or coagulation with a suitable non-solvent such as an alcohol. The coagulated or stripped polymer is then removed from the resulting medium by, e.g., centrifugation or extrusion. Residual solvent and other volatiles can be removed from the isolated polymer by heating, optionally under reduced pressure or in a forced air flow.

Compounding ingredients such as fillers, dyes, pigments, softeners and reinforcing agents can be added to the polymer during compounding operations.

In accordance with a further embodiment of this invention, there is provided a process for producing the polymers as defined above. This process includes basically two steps. The first step is the step in which a living polymer having the formula P-Li is produced. The second step is that in which this living polymer is coupled with the coupling agents of this invention as defined above.

The first step of this process is carried out by reacting a monofunctional lithium metal initiator system with the respective monomer or monomers to form the living polymer chain P-Li. This polymerization step can be carried out in one step or in a sequence of steps. In the case where the polymer chain P is a homopolymer or a random or tapered copolymer of two or more monomers, the monomers are simultaneously polymerized with the lithium metal initiator. In the case where the polymer chain P is a block copolymer comprising two or more homo- or copolymer blocks, these individual blocks can be generated by incremental or sequential monomer addition.

The monomers that are generally employed, as well as the monomers that are preferably used have been defined above in connection with the novel polymers of this invention. These monomers are also preferred for the process of the present invention.

The lithium metal-based initiator systems used in the first step of the process to make the coupled polymers of this invention are based on lithium having the general formula R'Li wherein R' is a hydrocarbyl radical of 1 to about 20 carbon atoms. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexylbutyllithium. The amount of the lithium metal initiator employed depends upon the desired properties of the polymer, particularly the desired molecular weight. Normally, the organomonolithium initiator is employed in the range of about 0.1 to 100 gram millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having 4-10 carbon atoms or a mixture of such diluents. Examples for the diluent are n-hexane, n-heptane, 2,2,4-trimethylpentane, cyclohexane, benzene and toluene. The reaction is generally carried out with a weight ratio of diluent to monomers exceeding 1. Preferably the diluent is employed in a quantity between about 400 to about 1500 parts by weight per 100 parts by weight of total monomers.

The polymerization reaction in step 1 usually occurs within a period of time ranging from a few minutes up to about 6 hours. Preferably, the reaction is carried out within a time period of about 10 minutes to about 2 hours. The polymerization temperature is not critical and will generally be in a range of about 15° to about 150° C., preferably in a range of about 40° to about 90° C.

At the conclusion of the polymerization in order to carry out the second or coupling step, the polymerization mixture is blended with the coupling agents. This is done before any material that would terminate the polymerization reaction and that would remove the lithium metal atom from the polymer chain is added to the reaction mixture. Thus the blending of the polymerization mixture and the coupling agents is carried out before any material such as water, acid or alcohol, is added to inactivate the living polymer. The second step of coupling the living polymer is thus carried out as described in detail above.

Various materials are known to be detrimental to the lithium metal-initiated polymerization. Particularly, the presence of carbon dioxide, oxygen, water and alcohols should be avoided during an organomonolithium-initiated polymerization reaction of step 1 of this combined process for making the coupled copolymers. Therefore, it is generally preferred that the reactants, initiators and the equipment be free of these materials and that the reaction is carried out under an inert gas such as nitrogen.

The invention is further illustrated by reference to the following Illustrative Embodiments which are given for the purposes of illustration only, and are not meant to limit the invention to the particular reactant and conditions employed therein.

ILLUSTRATIVE EMBODIMENT I

A styrene-butadiene block copolymer was prepared by initiation in styrene(S) monomer using sec-butyl lithium, propagation to about 11,000 (11 M) molecular weight (mol. wt.) polystyrene, addition of butadiene (B) monomer and further propagation to a total S-B mol. wt. of about 30 M. The batch was then split into two portions. To one portion (a) was added dimethyl adipate in stoichiometric quantity to react with the living (SB)-chain ends, thereby coupling them to three- and four-arm molecular configuration. The gel permeation chromatogram (GPC) of this material showed a single peak for the coupled polymer corresponding to an average of 3.27 arms. To the second portion (b) was added a mixture of coupling agents: 40%w of the mixture was methyl formate (functionality of 1.94) and 60%w of the mixture was dimethyl (functionality of 3.27). The objective of this reaction was to achieve an average functionality of 2.74. The resultant polymer showed to GPC peaks of 1.94 and 3.27 functionality, respectively, with a weighted average of 2.76.

Physical properties of these polymers were evaluated by compounding them in a shoe sole formulation at 80 parts by weight per hundred parts by weight rubber (phr) (41.5%w of total compound; see Table III). The polymer (a) made using the mixed coupling agents exhibited markedly improved flow properties with very little change in mechanical properties, compared to the polymer (b) made using a single coupling agent. (See Table IV).

TABLE III

| Formulation Used in Evaluation of Experimental Polymers | |
|---|---|
| | Parts by Wt. |
| KRATON ® Rubber X4158[1] | 30.0 |
| Experimental Polymer[2] | 80.0 |
| SHELLFLEX 311 (Added Oil) | 52.0 |
| Hydrated Silica | 23.0 |
| Flow-promoting Resin | 6.0 |
| Stearic Acid | 0.50 |
| UV Stabilizer | 0.45 |
| Antioxidants | 1.00 |
| Pigments | <1.0 |
| Total Parts by Wt. (Approx.) | 193.00 |

[1]A branched polymer of 29% styrene content and 33% oil content (SHELLFLEX 371).
[2]See descriptions of experimental polymers in Table IV.

TABLE IV

Experimental Polymers and Physical Properties

| | a | b |
|---|---|---|
| Coupling Agent(s) | Mixed DMA[(1)] + Methyl formate | DMA |
| Functionality, avg. | 2.76 | 3.27 |
| Total Mol. Wt., M | 88 | 103 |
| Compound Properties (Recipe in Table III): | | |
| Melt Flow, Cond. E, g/10 min. | 133 | 89 |
| Hardness, Rex, Inj. Molded, Inst. | 45 | 46 |
| Stiffness, Tinius Olsen, psi. | 170 | 170 |
| Tear Strength, pli | 40 | 40 |
| Ross Flex Crack Resistance, kc to 500% growth | 470 | 540 |
| Taber Abrasion Loss, $cm^3$/kc | 0.90 | 0.92 |
| Tensile Strength, psi. | 300 | 310 |
| 300% Modulus, psi. | 175 | 190 |
| Elongation, % | 590 | 580 |

[(1)]Dimethyl adipate.

What is claimed is:

1. A process for producing a branched polymer having an average functionality of about X arms comprising reacting a living lithium-terminated polymer having the polymer P-Li with a mixture of m moles of a first coupling agent and n moles of a second coupling agent wherein:
   (a) P is selected from the group consisting of polymer chains of one or more alkadienes having 4–12 carbon atoms and copolymers chains of one or more alkadienes having 4–12 carbon atoms and one or more monoalkenyl arenes of 8–18 carbon atoms having the alkenyl radical attached to an arene ring carbon atom;
   (b) said first coupling agent has a functionality of about Y;
   (c) said second coupling agent has a functionality of about Z;
   (d) the functionality values of X, Y and Z are all different; and
   (e) the amounts m and n are employed such that (m times Y) plus (n times Z) divided by (m+n) has a value between about 0.8X and 1.2X.

2. A process according to claim 1 wherein Y has a value of between about 1.5 and about 2.5 and Z has a value of greater than 3.0.

3. A process according to claim 2 wherein Z has a value of between about 3.2 and about 6.0.

4. A process according to claim 1 wherein said alkadiene is selected from the group consisting of isoprene and butadiene and said monoalkenyl arene is styrene.

5. A process according to claim 1 wherein P is a polymer chain of one or more alkadienes selected from the group consisting of butadiene and isoprene.

6. A process according to claim 1 wherein P is a block copolymer of styrene and butadiene with the butadiene block being attached to the lithium ion.

7. The polymer produced by the process of claim 1.

* * * * *